United States Patent [19]

Adams et al.

[11] 4,145,479

[45] Mar. 20, 1979

[54] HEAT RESISTANT CURABLE SURFACE COATING COMPOSITION COMPRISING THE REACTION PRODUCT OF AN UNSATURATED POLYARYLOXYPHOSPHAZENE AND AN UNSATURATED ARYLOXYCYCLOTRIPHOSPHAZENE

[75] Inventors: Bruce E. Adams, Landisville; Robert D. Hensel, Millersville; Edwin J. Quinn, Lancaster, all of Pa.

[73] Assignee: Armstrong Cork Company, Lancaster, Pa.

[21] Appl. No.: 922,309

[22] Filed: Jul. 6, 1978

[51] Int. Cl.² .............. B32B 27/16; B32B 27/18; C08L 43/02; C08L 47/00
[52] U.S. Cl. .................. 428/500; 106/18.17; 204/159.14; 260/874; 427/35; 427/54; 428/204; 526/27; 526/30
[58] Field of Search .............. 526/27, 30; 260/874; 428/500; 204/159.14; 106/15 FP; 427/54, 35

[56] References Cited

U.S. PATENT DOCUMENTS

| | | | |
|---|---|---|---|
| 3,676,311 | 7/1972 | Frank et al. | 260/159.14 |
| 3,943,088 | 3/1976 | Kyker et al. | 260/2 P |
| 4,055,520 | 10/1977 | Dieck | 260/874 |

OTHER PUBLICATIONS

Allcock, Chemtech, pp. 552–560, Sep. 1975.

*Primary Examiner*—J.C. Cannon
*Attorney, Agent, or Firm*—Dennis M. Kozak

[57] ABSTRACT

A curable coating composition comprising the reaction product of at least one unsaturated polyaryloxyphosphazene, at least one unsaturated aryloxycyclotriphosphazene, and a crosslinking agent is disclosed. In one embodiment, the coating composition is suitable for use as a cigarette burn resistant wear layer coating for thermoplastic floor coverings.

9 Claims, No Drawings

HEAT RESISTANT CURABLE SURFACE COATING COMPOSITION COMPRISING THE REACTION PRODUCT OF AN UNSATURATED POLYARYLOXYPHOSPHAZENE AND AN UNSATURATED ARYLOXYCYCLOTRIPHOSPHAZENE

This invention relates to curable coating compositions and, particularly, wear layer coating compositions having excellent burn resistance and the ability to undergo cure with peroxide initiators or radiation.

The resilient flooring industry is continually searching for polymeric compositions which are burn resistant, especially cigarette burn resistant, and usable as wear layer coatings for decorative floor coverings.

The present invention provides one such composition.

According to this invention, there is provided a thermoplastic floor covering coated with a curable wear layer composition comprising the reaction product of at least one unsaturated polyaryloxyphosphazene, and a crosslinking agent.

According to this invention, there is also provided a curable wear layer composition comprising the reaction product of at least one unsaturated polyaryloxyphosphazene, at least one unsaturated aryloxycyclotriphosphazene, and a crosslinking agent.

Also, according to this invention, there is provided a cured wear layer coating produced by curing a wear layer composition comprising the reaction product of at least one unsaturated polyaryloxyphosphazene, at least one unsaturated aryloxycyclotriphosphazene, and a crosslinking agent.

As the unsaturated polyaryloxyphosphazene, use can be made of materials having the formula

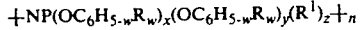

wherein each R separately represents hydrogen, chlorine, bromine, flourine, a ($C_1$ to $C_{10}$) linear or branched alkyl radical or a ($C_1$ to $C_4$) linear or branched alkoxy radical; $R^1$ represents:
—$OC_6H_4$—$CH=CH_2$,
—$OC_6H_3(R^2)$—$CH=CH_2$,
—$OC_6H_4$—$CH=CH(R^2)$,
—$OC_6H_3(R^2)$—$CH=CH(R^3)$,
—$OC_6H_4$—$CH_2CH=CH_2$,
—$OC_6H_3(R^2)$—$CH_2CH=CH_2$,
—$OC_6H_4CH(R^3)$—$CH=CH_2$,
—$OC_6H_4CH_2$—$C(R^2)=CH_2$,
—$OC_6H_4CH_2$—$CH=CH(R^3)$, or
—$OC_6H_4$—$CH=CH$—$(CH_2)_b$—$CH=CH_2$;
$R^2$ and $R^3$ each separately represent a halogen or an alkenyl, alkoxy, aryloxy, alkyl, or aryl radical; w has a value of from 0 to 5; z has a value greater than 0 and the sum of x + y + z equals 2; n has a value of from 2 to 3100; and b has a value of from 0 to 4.

Unsaturated polyaryloxyphosphazene suitable for use in this invention and methods for their production are taught in U.S. Pat. No. 4,053,456, herein incorporated by reference.

As the unsaturated aryloxycyclotriphosphazene, use can be made of compounds having the formula

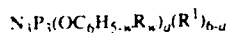

wherein R, $R^1$, and w are as defined above, and a has a value of up to 6 but cannot equal 0.

Unsaturated aryloxycyclotriphosphazenes suitable for use in this invention and methods for their preparation are taught in U.S. Application Ser. No. 821,226, herein incorporated by reference.

As the crosslinking agent, use can be made of any organic compound bearing two or more thiol groups. Examples of usable thiol crosslinking agents are taught in U.S. Pat. No. 3,676,311, herein incorporated by reference.

Particularly suitable crosslinking agents are glycol dimercaptoacetate, glycol dimercaptopropionate, trimethyolethane tri(3-mercaptopropionate), trimethyolethane trithioglycolate, trimethyolpropane tri(3-mercaptopropionate), trimethyolpropane trithioglycolate, pentaerythritol tetra(3-mercaptopropionate), polyethyleneglycol di(3-mercaptopropionate), mixtures thereof, and the like.

In one preferred embodiment of this invention, since the unsaturated polyaryloxyphosphazene is generally in the solid state, a sufficient amount of a suitable solvent is employed in order to dissolve the solid unsaturated polyaryloxyphosphazene.

Particularly suitable solvents include ethyl acetate, methyl acetate, butyl acetate, methyl acrylate, ethyl acrylate, methyl ethyl ketone, mixtures thereof, and the like.

As the catalyst, which is employed to promote the cross-linking reaction, use can be made of a variety of free radical catalysts capable of promoting the reaction between ethylenic double bonds. Frequently preferred are the well-known peroxide initiators (e.g., benzoyl peroxide, di-cumyl peroxide, etc.), as well as electron beam radiation. Alternatively, if one desires to use ultraviolet radiation to cure the compositions of this invention, a variety of art recognized photoinitiators (e.g., benzophenone, benzoin isobutyl ether, 2-phenyl-2,2-dimethoxyacetophenone) and activators (e.g., triethanolamine, methyldiethanolamine) can be employed in the wear layer compositions, being employed in art recognized amounts.

The amounts of the phosphazene components employed in this invention can be varied within wide ranges. In general, the unsaturated polyaryloxyphosphazene component and the unsaturated aryloxycyclophosphazene component will each separately be employed in an amount within the range of from about 10 to about 90 parts per 100 parts of the total phosphazene component content of the wear layer composition.

The amount of crosslinking agent employed is dependent on the number of ethylenic double bonds in the total amount of phosphazene component content of the wear layer composition. Crosslinking agent will be employed such that for each ethylenic double bond of the phosphazene components there is from about 0.2 to about 1.4 thiol groups. Preferably, the double bond to thiol group ratio is 1:1.

The wear layer composition of this invention can also be formulated to include various art recognized amounts of optional ingredients typically employed in wear layer compositions such as surfactants, heat and light stabilizers, and the like.

The wear layer composition of this invention is prepared by conventional methods such as described below. The composition can be applied to any surface covering, for example, flooring sheet or tile products, being applied using any suitable means of application (e.g., curtain coater) such that, upon curing, the coating is present on the surface covering at a thickness of from about 1 to about 20 mils. Preferably, the coating thickness is from about 4 to about 8 mils.

Having described the ingredients of this invention, reference is now made to the following examples which are provided by way of illustration and not by way of limitation of the practice of this invention.

EXAMPLE I

This example demonstrates the preparation of poly(dichlorophosphazene).

To a 15 ml glass tube were added 0.54 g anhydrous aluminum chloride (AlCl$_3$) and 7.4 g hexachlorocyclotriphosphazene (NPCl$_2$)$_3$, which (NPCl$_2$)$_3$ had been purified by crystallization from heptane and distillation. The concentration of the AlCl$_3$ was 0.72 weight percent or 1.90 mole percent.

A vacuum pump was connected to the tube, now containing trimer and catalyst, and vacuum was applied for about 30 minutes, until a pressure of $10^{-2}$ Torr was obtained.

Next, the tube was sealed and heated to about 175° C. for about 60 hours, at which point the poly(dichlorophosphazene) contained in the tube was recovered and dissolved in 300 ml toluene to form an anhydrous toluene solution of poly(dichlorophosphazene).

EXAMPLE II

This example demonstrates the preparation of an unsaturated polyaryloxyphosphazene having the formula

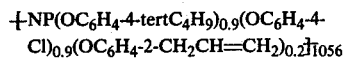

The anhydrous toluene solution of poly(dichlorophosphazene) formed in Example I was added to an anhydrous diglyme-benzene solution containing 0.75 equivalent of NaOC$_6$H$_4$-4-Cl, 0.75 equivalents of NaOC$_6$H$_4$-4-t-C$_4$H$_9$, and 0.5 equivalent of NaOC$_6$H$_4$-2-CH$_2$CH=CH$_2$ at a temperature of about 95° C. with constant stirring.

After the addition, benzene was distilled from the reaction mixture until a temperature of from about 115°–116° C. was attained, and then the reaction product was heated at reflux for about 50 to about 65 hours.

Next, the reaction product was poured into an excess of methyl alcohol with constant stirring for about 24 hours, and the resulting precipitate (a terpolymer) was added to a large excess of water with constant stirring for about 24 hours.

The resulting terpolymer, as shown above, was recovered in a yield of about 53% and found to be soluble in benzene, toluene, tetrahydrofuran, and dimethylformamide.

The terpolymer, unsaturated polyaryloxyphosphazene, was tested and found to have a weight average molecular weight as determined by gpc of 338,000, a Tg of 0.5° C. as determined by differential scanning calorimetry, and a 9.56% chlorine content.

EXAMPLE III

This example demonstrates the preparation of an unsaturated aryloxycyclotriphosphazene having the formula

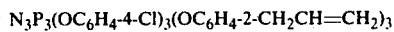

A solution containing 2.65 equivalents of sodium in 300 milliliters of diglyme was added to a solution containing 1.29 equivalents of p-chlorophenol and 1.42 equivalents of o-allylphenol in 1000 milliliters of diglyme, and the mixture was heated to a temperature of about 75° to about 80° C.

The resulting mixture was introduced into a mixing vessel containing a solution of 0.431 equivalents of hexachlorotriphosphazene in 1000 milliliters of diglyme.

The resulting product was heated for about 5 hours at about 100° C., cooled to room temperature, and added to a large excess of water with stirring.

The water was removed by decantation, and the resulting product was dissolved in ether and washed several times with water.

The resulting product was dried under reduced pressure and was recovered in a yield of about 92% as an unsaturated aryloxycyclotriphosphazene having the formula shown above.

The unsaturated aryloxycyclotriphosphazene was tested and found to have a chlorine content of about 11.8% and an ethylene double bond content of about 7.68%.

EXAMPLE IV

This example demonstrates the preparation of a coating composition of this invention.

To a reaction vessel were added about 100 grams of the unsaturated polyaryloxyphosphazene of Example II and about 100 grams of the unsaturated aryloxycyclotriphosphazene of Example III, with stirring.

To the resulting mixture was added a sufficient amount of a solvent mixture (80 parts by weight ethyl acetate/20 parts by weight methyl ethyl ketone) such that the resulting solution has a 60% solids content.

Next the ethylene double bond content of the phosphazene components was calculated, and 42.8 grams of pentaerythritol tetra($\beta$-mercaptopropionate) were added with stirring in order to obtain a double bond to thiol group ratio of 1:1.

The resulting product was recovered as a curable coating composition of this invention.

EXAMPLE V

This example demonstrates the preparation of a cured coating of this invention.

To the total amount of curable coating composition produced in Example IV were added 4 grams (2% by weight of the phosphazene component) of 2-phenyl-2,2-dimethoxyacetophenone, with stirring.

The resulting coating composition was applied to a thickness of 4 mils, using a Bird applicator, to a ⅛ inch thick polyethylene substrate.

The resulting coated substrate was placed in an oven at a temperature of about 140° F. for about 10 minutes and then subjected to from about 4 to about 6 joules/cm$^2$ of ultraviolet light to cure the coating composition.

The cured coating was observed to be a clear, hard, glossy film and was tested and found to have a tensile strength as determined by Instron measurement of about 1298 psi, a percent elongation as determined by Instron measurement of 53, and Tg of about 24° + 8° C. as determined by differential scanning calorimetry.

EXAMPLE VI

This example demonstrates the preparation of a cured coating of this invention.

A coating composition was prepared using substantially the procedures of Example V and the following ingredients:

| Ingredients | Amounts |
| --- | --- |
| unsaturated polyaryloxyphosphazene of Example II | 70.0 g |
| unsaturated aryloxycyclotriphosphazene of Example III | 30.0 g |
| pentaerythritol tetra (-mercaptopropionate) | 12.4 g |

The resulting curable coating composition was coated, to a 4 mil thickness, on a ⅛ inch thick polyethylene substrate using a Bird applicator.

The resulting coating composition on the substrate was cured by exposure to electron beam radiation at a radiation dosage of 10 megarads/cm$^2$.

The cured film was observed to be clear and glossy and was tested and found to have a tensile strength of about 703 psi, a percent elongation value of 144, and a Tg of 23° + 8° C.

EXAMPLE VII

This example demonstrates the superior cigarette burn resistance of a cured wear layer coating of this invention as compared to a prior art vinyl wear layer coating and a prior art urethane wear layer coating.

Six identical commercial vinyl-asbestos flooring tiles were separately coated. Two tiles were coated with the wear layer coating composition of Example V (A Tiles), two tiles were coated with a prior art vinyl wear layer composition (B Tiles), and two tiles were coated with a prior art urethane wear layer composition (C Tiles). After all wear layer coatings were cured, three coated tiles (one A, one B, and one C Tile) were subjected to the National Electrical Manufacturer's Association, Cigarette Burn Test (LD 1-2.04) in which test a heating element at a temperature of 290° C. is positioned 0.313 inch from the coating surface and the time to failure (e.g, char, blister, crazing, or permanent discoloration) up to 10 minutes is recorded. And, three coated tiles (one A, one B, and one C Tile) were subjected to an actual cigarette burn test consisting of the placing of two lighted cigarettes on the wear surface of the cured coating and allowing the cigarettes to burn completely. The burn areas were wiped clean with a nylon pad, observed, and rated for amount of stain or char using the following visual rating scale:

| Amount of Stain or Char | Rating |
| --- | --- |
| none | 0 |
| trace | 1 |
| slight | 2 |
| moderate | 3 |
| severe | 4 |

The following table illustrates the results of the above tests.

| Tiles | Coating Thickness (Mils) | Test NEMA LD 1-2.04 (Time to Failure, min.) | Actual (Rating) |
| --- | --- | --- | --- |
| A (Invention) | 5 | 5:43 | 1-2 |
| B | 4 | 2:24 | 4 |
| C | 10 | 2:39 | 4 |

The above data indicate the effectiveness of the cured wear layer coatings of this invention as compared to the prior art wear layer coatings in resisting cigarette burns.

It will be evident from the foregoing that various modifications can be made to this invention. Such, however, are considered to be within the scope of this invention.

What is claimed is:

1. A thermoplastic floor covering coated with a curable wear layer composition comprising the reaction product of at least one unsaturated polyaryloxyphosphazene, at least one unsaturated aryloxycyclotriphosphazene, and a crosslinking agent.

2. The thermoplastic floor covering of claim 1 in which said unsaturated polyaryloxyphosphazene has the formula

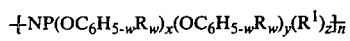

wherein each R separately represents hydrogen, chlorine, bromine, flourine, a ($C_1$ to $C_{10}$) linear or branched alkyl radical or a ($C_1$ to $C_4$) linear or branched alkoxy radical; $R^1$ represents —$OC_6H_4$—CH=$CH_2$, —$OC_6H_3(R^2)$—CH=$CH_2$, —$OC_6H_4$—CH=CH($R^2$), —$OC_6H_3(R^2)$—CH=CH($R^3$), —$OC_6H_4$—$CH_2$CH=$CH_2$, —$OC_6H_3(R^2)$—$CH_2$CH=$CH_2$, —$OC_6H_4(R^3)$—CH=$CH_2$, —$OC_6H_4$-$CH_2$—C($R^2$)=$CH_2$, —$OC_6H_4CH_2$—CH=CH($R^3$), or —$OC_6H_4$—CH=CH—$(CH_2)_b$—CH=$CH_2$; $R^2$ and $R^3$ each separately represent a halogen or an alkenyl, alkoxy, aryloxy, alkyl, or aryl radical; w has a value of from 0 to 5; z has a value greater than 0 and the sum of x + y + z equals 2; n has a value of from 2 to 3100; and b has a value of from 0 to 4.

3. The thermoplastic floor covering of claim 1 in which said aryloxyphosphazene has the formula

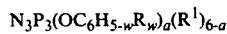

wherein R, $R^1$, and w are as defined above, and a has a value up to 6 but cannot equal 0.

4. The thermoplastic floor covering of claim 1 in which said crosslinking agent is an organic compound bearing two or more thiol groups.

5. The thermoplastic floor covering of claim 1 wherein the wear layer composition is cured under free radical conditions.

6. The thermoplastic floor covering of claim 5 in which said free radical conditions are induced by a peroxide curing agent.

7. The thermoplastic floor covering of claim 5 in which said free radical conditions are induced by radiation.

8. A curable coating composition comprising the reaction product of at least one unsaturated polyaryloxyphosphazene, at least one unsaturated aryloxycyclotriphosphazene, and a crosslinking agent.

9. A cured coating produced by curing, under free radical conditions, a composition comprising the reaction product of at least one unsaturated polyaryloxyphosphazene, at least one unsaturated aryloxycyclotriphosphazene, and a crosslinking agent.